July 6, 1943.     L. PAPE ET AL     2,323,841
DISPENSING PACKAGE FOR ICE CREAM CONES
Filed April 3, 1940     2 Sheets-Sheet 1
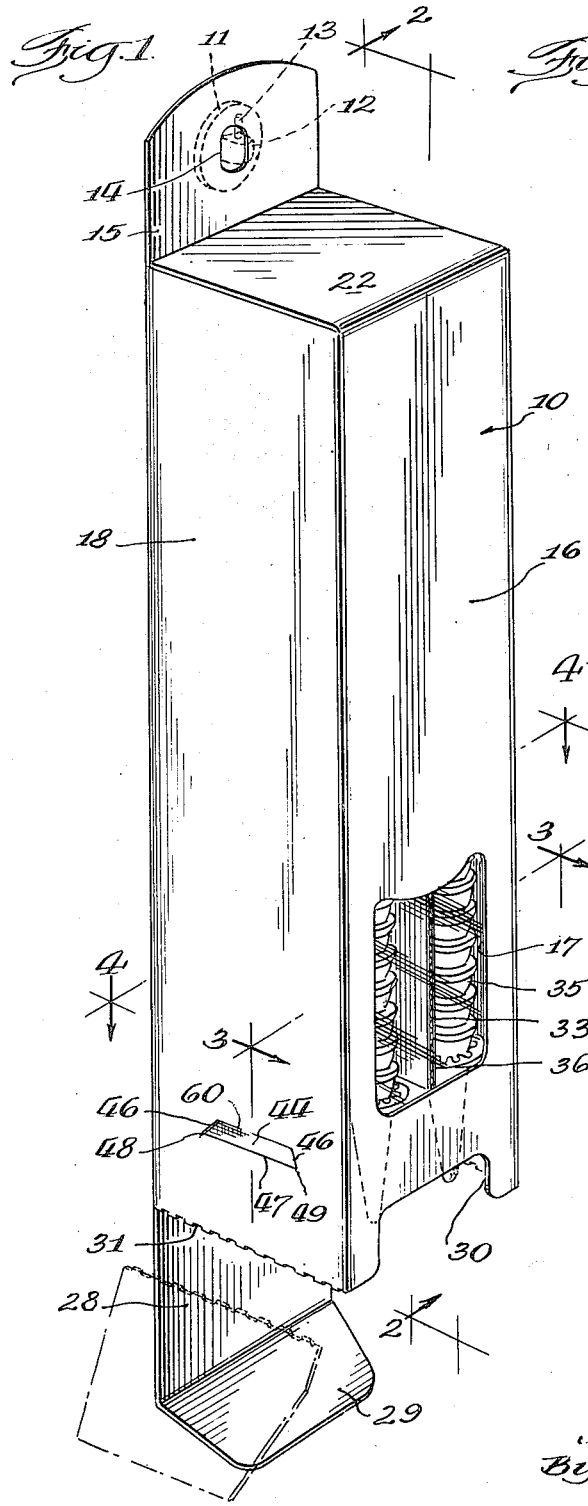
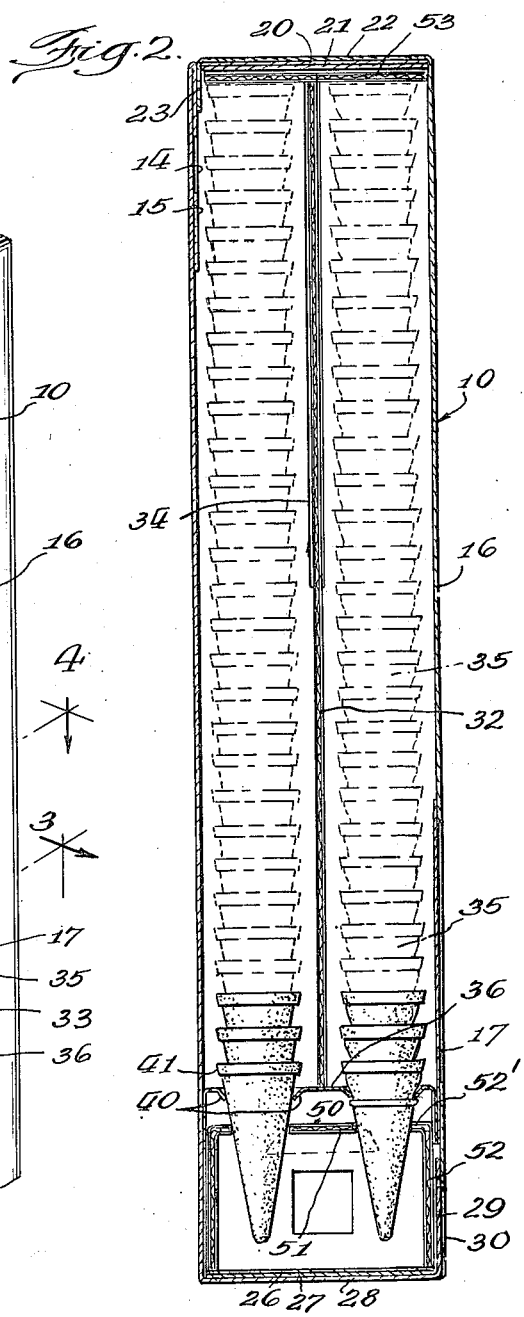
Inventors.
Larry Pape
Murray Weintraub
By McCalet & Hendt
Attys.

July 6, 1943.  L. PAPE ET AL  2,323,841
DISPENSING PACKAGE FOR ICE CREAM CONES
Filed April 3, 1940  2 Sheets-Sheet 2
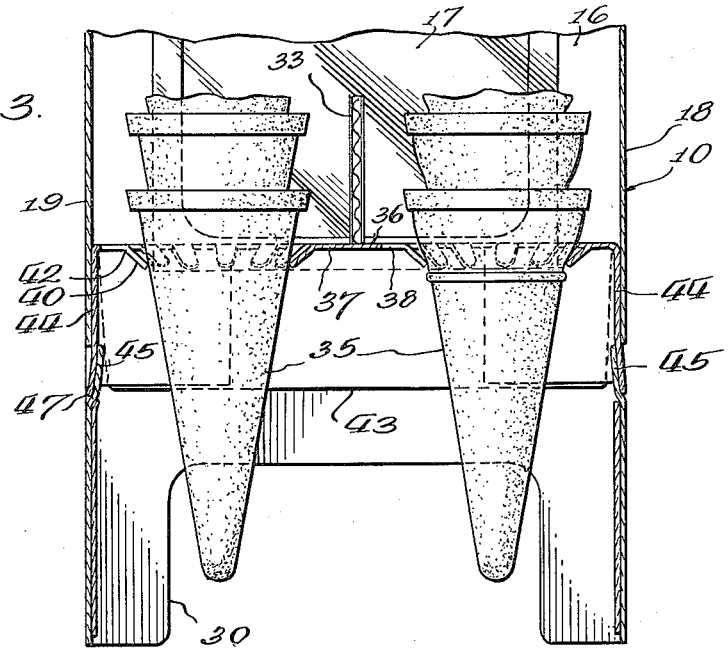
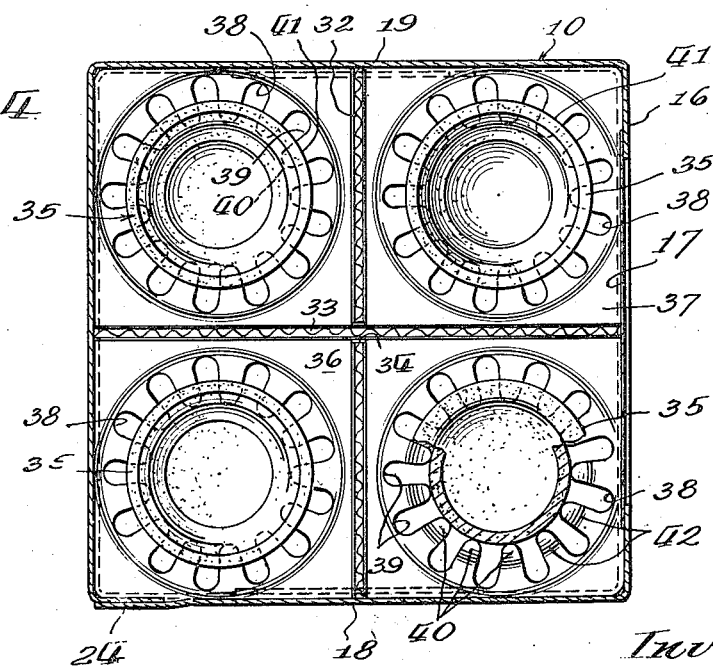
Inventors
Larry Pape
Murray Weintraub
Attys Patented July 6, 1943

2,323,841

UNITED STATES PATENT OFFICE 2,323,841

DISPENSING PACKAGE FOR ICE CREAM CONES

Larry Pape and Murray Weintraub, Chicago, Ill., assignors to The Milko Cone & Baking Co., Inc., Chicago, Ill., a corporation of Illinois Application April 3, 1940, Serial No. 327,642

8 Claims. (Cl. 206—56)

The present invention relates to dispensing packages for ice cream cones, and is a continuation-in-part of our prior application, Serial No. 196,315, filed March 17, 1938, which has been abandoned in favor of this application.

This application relates to an improved commercial embodiment of the invention, and is substituted for the above-mentioned application.

One of the objects of the invention is the provision of an improved package which may serve not only for the protection and enclosure of the ice cream cones during storage and shipment, but for the convenient dispensing of the cones one by one as they are being used by the vendor of ice cream.

The dispensing devices of the prior art of which we are aware all involve the use of auxiliary dispensing mechanism usually constructed of metal and other structural material than the paper of which ice cream cone packages is made. Such ice cream cone dispensers are expensive and add to the cost of shipment of cones, and the dispensers of the prior art also wear out after use with a predetermined number of cones and have to be replaced.

One of the objects of the invention is the provision of an improved ice cream cone dispenser which is constructed out of the same material as the paper or cardboard package in which the ice cream cones are enclosed, so that it may be manufactured and sold at a minimum cost and placed within the reach of a larger number of the purchasing public.

Another object of the invention is the provision of an improved ice cream cone package which may also serve to dispense the ice cream cones so that the cones may be kept in the same package and it is not necessary to remove them to place them in a separate dispenser, nor it is necessary to place the package and cones in a separate dispenser.

Another object of the invention is the provision of an improved structure for ice cream cone dispensers which is so cheap that it may be provided in every ice cream cone package and sold with every package of ice cream cones at such a low cost that it practically does not increase the cost of the cones or the cost of selling the cones.

Another object of the invention is the provision of an ice cream cone dispensing package which also serves for the shipment of the ice cream cones and which is adapted to hold the the cones in proper position against breakage not only during shipment but during the dispensing of the cones.

Another object is the provision of an improved ice cream cone dispensing package which encloses the cones as much as is consistent with the making of the cones readily accessible for use during the operation of the dispenser, and which may also be operated to completely close the bottom of the dispensing package cone, if desired, at the end of the day.

Another object of the invention is the provision of an improved ice cream cone dispensing package which is adapted to be conveniently attached to the mirror of the back bar, where there is more room, since the soda fountain is usually already filled with too many other dispensing devices.

Other objects and advantages of the invention will be apparent from the following description and the accompanying drawings, in which similar characters of reference indicate similar parts throughout the several views.

Referring to the two sheets of drawings accompanying the specification,

Fig. 1 is a view in perspective of an ice cream cone dispensing package supported upon the back bar or other convenient support;

Fig. 2 is a vertical sectional view, taken on a plane corresponding to the line 2—2 of Fig. 1, with the package in the condition in which it appears when it is ready for shipment;

Fig. 3 is a fragmentary sectional view, taken on a vertical plane, corresponding to the plane of the line 3—3 of Fig. 1, showing the mode of support of the cones and of the cone-supporting partition in the package;

Fig. 4 is a horizontal sectional view, taken on the plane of the line 4—4 of Fig. 1, looking in the direction of the arrows.

Referring to Fig. 1, 10 indicates the ice cream cone dispensing package in its entirety, and 11 indicates a supporting device, such as a rubber suction member, provided with a forwardly extending stud 12, having an upwardly extending pin 13. The rubber suction member 11 is peculiarly adapted to be secured to the mirror of a back bar, and its forwardly extending stud 12 may extend through an aperture 14 in the flap 15, which may be extended vertically from the upper end of the package.

The main body of the package 10 comprises a box of cardboard, the four sides of which are rectangulard in shape, and it is made out of a blank comprising four rectangles of cardboard attached to each other and folded as shown to produce a rectangular box.

The two adjacent ends of the blank are secured together by means of an extension or attachment flap, and the flaps which appear at the top and bottom of the package, and which effect a closure thereof, are also integral parts of the box sides.

The front wall 16 is preferably formed with a window 17, which may be wide enough to expose a plurality of stacks of cones, and the window 17 may be closed by a transparent sheet of material sold on the market under the name "Cellophane," or other suitable flexible transparent material. The upper end of the box may have the flap 15 folded downward into the box at the time of shipment, and the two side walls 18 and 19 may have end flaps 20 and 21, which are folded over at the top under the closure flap 22, which has an inwardly extending portion 23. The overlapping attachment flap 24 of the box is seen in Fig. 4, and the transparent window 17 in Fig. 2.

At the lower end of the box the side walls may again be provided with the two flaps 26 and 27, which are folded over inside the closure flap 28. The closure flap 28 has an upwardly extending folded portion 29 of sufficient length to close a cut-out 30, which is conveniently located for insertion of the hands, to grasp the cones. In order to make the bottom present a better appearance, when the package is being used for dispensing cones, the two bottom side flaps 26 and 27, may be partially perforated at 31, as shown in Fig. 1, so that they may be torn off and removed from the package when the package has reached its destination, and it is being used as a dispenser.

In addition to the closure flaps and other parts used at the end of the box, the box may be sealed by the use of ordinary adhesive gummed paper at each end.

The dispensing package 10 may be made of any convenient size for housing as many stacks of cones as is desirable, from one, two, three, four, or more stacks. In the embodiment selected to illustrate the invention, four stacks of cones are used, and therefore the box is wide enough to house these four stacks and to permit the insertion of the partitions 32 and 33. These partitions may be made of corrugated cardboard and may comprise rectangular pieces of sufficient size to fit in the box and divide it into four chambers.

The two partitions 32 and 33 are each provided with a slot 34, the slot extending half way through each partition, so that they may be placed together, as shown in Fig. 4.

The stacks of cones 35 are preferably carried by a supporting member 36, which is peculiarly adapted to be constructed and installed with a minimum amount of labor. This supporting member 36 comprises a sheet of cardboard, best illustrated in Fig. 3, which has its horizontal portion 37 provided with four apertures 38, one for each stack of cones. The apertures 38 are generally circular, except that the border of each aperture is formed with a plurality of regularly spaced outwardly extending grooves 39, and inwardly extending fingers 40.

The length of the grooves and fingers is such that the largest diameter 41 of the cone comes substantially half way between the base of the groove and the tip of the finger, as shown by the circle 41 in Fig. 4. The width of the fingers and grooves may be substantially the same, and the fingers are preferably of substantial width, as are the grooves also.

One of the most important features of the invention lies in the structure of this supporting partition 36. The fingers 40 are preferably bent diagonally downward at a point 42, which is slightly inward of the largest diameter 41 of the cone. The partition 36 is formed on its front and back side with a depending flap 43, and on each of its lateral sides with a depending flap 44.

The depending flaps 44 are the main support of the partition 36 in the box. For this purpose the box is provided with upwardly extending punched out tongues 45, by means of substantially U-shaped slits 46.

Referring to Fig. 1, the upwardly extending line 46 and the horizontal line 60 indicate the slit portion of the tongue. The line 47 indicates the downwardly presented edge of a horizontal slit 47 in each of the flanges 44, which engage outside of the flap 45, and are supported by the flap 45 (Fig. 3).

Strictly speaking, it is the lower ends of the slits 46 which support the downwardly presented edge 47 of the slit in the flanges 44. As the flanges 44 are as long as the box is wide, the ends of these flanges 44 serve to prevent any teetering of the partition in the box. Furthermore, the length of the flap 45 gives the flange 44 support at two widely spaced points, indicated at 48 and 49. Thus it is unnecessary to use any permanent fastening devices for the partition 36, and it may be removed as often as desired.

The package may be used merely as a shipping package, without the partition 36 or it may be utilized as a combined shipping and dispensing package. The weight of the stacks of cones on the partition 36 assures the partition being held in permanent engagement with the flaps 45, and all that is necessary is to grasp the lower end of a cone and draw it downward, whereupon the fingers 40 will bend downward and permit one cone to be released from the dispensing package.

In order to make such that the cones will be adequately supported during shipping, however, the box is also preferably provided with a supporting member 50, which has its main body 51 of rectangular shape and adapted to fit inside the box. This supporting member has four depending flanges 52, each of which is as wide as the inside of the box, and the main body 51 is provided with four apertures 52', which fit firmly against the lower conical part of the cone at a point substantially midway between its ends.

The lower edges of the depending flanges 52 engage the lower cover flaps 26, and thus the stacks of cones are adapted to be firmly supported in the box by the supporting member 50 during shipping. In addition to this, the top of the cones may be covered by a rectangular member 53 of corrugated cardboard, thus filling in all open space between the stacks of cones and the upper and lower walls of the box, and preventing any shifting of the cones.

The operation of the dispensing package will be apparent from the description of its parts. The present package may be used for shipping and dispensing, and it is unnecessary to provide any other dispenser with the package, as it is in the devices of the prior art of which I am aware.

The package is sanitary and permits the dealer to keep the cones in the package until they are to be used. None of the cones are exposed except those which are lowermost in the package, and of these only the lower end is exposed. Even these may be covered up when the cones are not being removed, by merely pushing up the flap 28, which is secured by the flap 29 inside the lower part of the box.

The package protects the cones against dust and dampness; there is no exposure of the cones to air, and no breakage in the handling of the cones. The sanitary handling of the ice cream cones by this dispenser appeals to the purchasers of ice cream cones, and increases the salability of the product.

Since it is not necessary to provide any separate dispenser for the packages of cones, much expense is saved, and it is never necessary to replace a dispenser, as the present dispensing arrangements are so cheap that they may be provided with every package without substantially increasing the cost.

The present dispensing arrangement is simpler than any of the devices of the prior art, as it requires no auxiliary springs or metal supports, and does not involve the use of expensive materials, such as metal or other materials than the paper of which the packages are usually constructed.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a combined shipping and dispensing package for ice cream cones, the combination of a substantially rectangular cardboard container of elongated shape adapted to receive a stack of cones, and having upper and lower closure flaps adapted to be closed at the ends thereof, with a cone supporting partition above the lower end thereof, said cone supporting partition having a horizontal body provided with an aperture for passing cones, said aperture having inwardly extending fingers spaced from each other by slots of substantially the same width as said fingers and extending inwardly to support said cones by peripheral engagement for convenient removal, and said partition having a pair of depending flaps fitting against the sides of said container, said container having inwardly extending integral flaps inwardly of its lower end and extending upward inside the flaps of said partition to support said partition, a second partition beneath and spaced from said first partition, said second partition having an aperture for receiving and peripherally supporting the lower end of the lowermost cone in the stack in position with its tip spaced from the bottom of said container, said second partition having downwardly extending flaps engaging the lower closure flap of the container, and being removable from said container in the use of the same as a dispensing package.

2. In a combined shipping and dispensing package for ice cream cones, the combination of a substantially rectangular container of elongated shape, a cone supporting partition located inwardly of the bottom of said container and having an aperture therein formed with radial spring fingers for peripherally supporting the lowermost cone of a stack and permitting its downward removal from such stack, a second apertured partition spaced beneath said first partition, said second partition being apertured for peripherally receiving and supporting the lowermost cone of such stack with its tip out of contact with the bottom of said container, said container having a pair of inwardly folding bottom flaps and a third bottom flap adapted to extend across said inwardly folding flaps, said second partition having downwardly extending portions engageable with said pair of inwardly folding flaps to retain it spaced from the bottom of said container in shipment, said inwardly extending bottom flaps being removable from said container, and said second partition being removable in use of said container as a dispensing package.

3. A combined shipping and dispensing carton comprising an elongated container adapted to house a stack of nested ice cream cones, a cone supporting member fixed in said container adjacent to and in inwardly spaced relation to the lower end of the container for supporting the stack of cones, said cone supporting member being provided with means permitting the lowermost cone to project partially therethrough and to be forcibly withdrawn therethrough, and a hollow filler removably positioned in said container below said cone supporting member and having means for preventing downward movement of the cones through said cone supporting member, said hollow filler being of sufficient height to maintain the lower end of the lowermost cone in the stack with its tip spaced from the bottom of said container, said container being provided with closure flaps at the lower end thereof, said flaps supporting said filler in operative position.

4. A combined shipping and dispensing carton comprising an elongated cardboard container adapted to house a plurality of stacks of nested ice cream cones, said container being provided with partitions separating the container into compartments for separate stacks of cones, cone supporting means carried by said container at the lower end of said compartments for removably supporting the cones in stacks, the lowermost cone projecting partially through said means to be forcibly withdrawn therethrough, and a hollow filler member removably positioned in said container below said cone supporting means and comprising a pair of downwardly extending ffanges and carrying a horizontal cone-supporting table, said cone-supporting table being provided with apertures for engaging that part of the cones projecting through said cone-supporting means, and positively supporting the stacks of cones with the tips of the lowermost cones spaced from the end of said container.

5. A combined shipping and dispensing carton comprising an elongated cardboard container adapted to house a plurality of stacks of nested ice cream cones, said container being provided with partitions separating the container into compartments for separate stacks of cones, cone supporting means carried by said container at the lower end of said compartments for removably supporting the cones in stacks, the lowermost cone projecting partially through said means to be forcibly withdrawn therethrough, and a hollow filler member removably positioned in said container below said cone supporting means and comprising a pair of downwardly extending flanges and carrying a horizontal cone-supporting table, said cone-supporting table being provided with apertures for engaging that part of the cones projecting through said cone-supporting means, and positively supporting the stacks of cones with the tips of the lowermost cones spaced from the end of said container, said carton having at its upper end an apertured flap adapted to be secured to the upper end of the carton or to be extended longitudinally of the carton as a support when the carton is used as a dispenser.

6. A combined shipping and dispensing corton comprising an elongated coardboard container adapted to house a plurality of stacks of nested ice cream cones, said container being provided with partitions separating the container into compartments for separate stacks of cones, cone supporting means carried by said container at the lower end of said compartments for removably supporting the cones in stacks, the lowermost cone projecting partially through said means to be forcibly withdrawn therethrough, and a hollow filler member removably positioned in said container below said cone supporting means and comprising a pair of downwardly extending flanges and carrying a horizontal cone-supporting table, said cone-supporting table being provided with apertures for engaging that part of the cones projecting through said cone-supporting means, and positively supporting the stacks of cones with the tips of the lowermost cones spaced from the end of said container, said cone-supporting means having downwardly extending flaps engaged at their lower edges in a pair of downwardly extending slits located in the opposite sides of the carton, the said slits being joined by a transverse slit forming an upwardly extending flap in the walls of the carton.

7. A combined shipping and dispensing carton comprising an elongated container adapted to house a stack of nested ice cream cones, a cone-supporting member fixed in said container adjacent to and in inwardly spaced relation to the lower end of the container for supporting the stack of cones, said cone-supporting member being provided with means permitting the lowermost cone to project partially therethrough and to be forcibly withdrawn therethrough, and a hollow filler removably positioned in said container below said cone-supporting member and having means for preventing downward movement of the cones through said cone-supporting member, said hollow filler being of sufficient height to maintain the lower end of the lowermost cone in the stack with its tip spaced from the bottom of said container, said container being provided with closure flaps at the lower end thereof, said flaps supporting said filler in operative position, said container having at its upper end a flap adapted to be secured to the upper end of the container for shipping and adapted to be extended longitudinally, and provided with an aperture whereby the flap may serve as a support for the container when it is being used as a dispenser.

8. A combined shipping and dispensing carton comprising an elongated container adapted to house a stack of nested ice cream cones, a cone-supporting member fixed in said container adjacent to and in inwardly spaced relation to the lower end of the container for supporting the stack of cones, said cone-supporting member being provided with means permitting the lowermost cone to project partially therethrough and to be forcibly withdrawn therethrough, and a hollow filler removably positioned in said container below said cone-supporting member and having means for preventing downward movement of the cones through said cone-supporting member, said hollow filler being of sufficient height to maintain the lower end of the lowermost cone in the stack with its tip spaced from the bottom of said container, said container being provided with closure flaps at the lower end thereof, said flaps supporting said filler in operative position, said cone-supporting member having oppositely disposed downwardly extending flaps engaging the side walls of the container and located in downwardly extending slits in the side walls of said container, said slits being joined by a transverse slit forming a flap in the opposite side walls of the container which is located inside of the downwardly extending flaps on said member

LARRY PAPE.
MURRAY WEINTRAUB.